(12) United States Patent
Schemmann et al.

(10) Patent No.: US 9,379,830 B2
(45) Date of Patent: Jun. 28, 2016

(54) DIGITIZED BROADCAST SIGNALS

(71) Applicant: ARRIS Enterprises, Inc., Suwanee, GA (US)

(72) Inventors: Marcel F. Schemmann, Maria Hoop (NL); Zoran Maricevic, West Hartford, CT (US); Zhijian Sun, Avon, CT (US); Dean Painchaud, Cromwell, CT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/462,062

(22) Filed: Aug. 18, 2014

(65) Prior Publication Data

US 2015/0050025 A1    Feb. 19, 2015

Related U.S. Application Data

(60) Provisional application No. 61/866,659, filed on Aug. 16, 2013.

(51) Int. Cl.
| | |
|---|---|
| *H04Q 11/00* | (2006.01) |
| *H04J 14/02* | (2006.01) |
| *H04N 21/65* | (2011.01) |
| *H04H 20/69* | (2008.01) |
| *H04J 14/08* | (2006.01) |

(52) U.S. Cl.
CPC ............ *H04H 20/69* (2013.01); *H04J 14/0238* (2013.01); *H04J 14/08* (2013.01); *H04Q 11/0003* (2013.01); *H04Q 11/0067* (2013.01)

(58) Field of Classification Search
CPC .................. H04Q 11/0003; H04J 14/0238
USPC ............................. 398/68, 66, 43
See application file for complete search history.

(56) References Cited

U.S. PATENT DOCUMENTS

| | | | | |
|---|---|---|---|---|
| 2015/0020134 | A1* | 1/2015 | Bowler | H04L 12/2801 725/116 |
| 2015/0050025 | A1* | 2/2015 | Schemmann | H04Q 11/0003 398/68 |

* cited by examiner

*Primary Examiner* — Oommen Jacob
(74) *Attorney, Agent, or Firm* — Bart A. Perkins

(57) ABSTRACT

Methods, systems, and computer-readable media can facilitate digitizing a broadcast transmission and transporting the digitized broadcast transmission along with one or more digitized narrowcast transmissions to a subscriber. In embodiments, a digitized broadcast transmission and one or more digitized narrowcast transmissions can be separately demodulated and the transmissions can be combined at one or more receiving nodes. In embodiments, a digitized broadcast transmission can be combined with one or more digitized narrowcast transmissions. Lossless compression and de-compression techniques can be used to optimally transport digitized broadcast and narrowcast signals.

20 Claims, 10 Drawing Sheets

DIGITIZED BROADCAST SIGNALS

CROSS REFERENCE TO RELATED APPLICATION

This application is a non-provisional application claiming the benefit of U.S. Provisional Application Ser. No. 61/866,659, entitled "Broadband Digital Forward," which was filed on Aug. 16, 2013, and is incorporated herein by reference in its entirety.

TECHNICAL FIELD

This disclosure relates to digitizing broadcast signals.

BACKGROUND

U.S. patent application Ser. No. 13/175,681 ("the '681 patent application"), filed Jul. 1, 2011, entitled, "Overlay System With Digital Optical Transmitter For Digitized Narrowcast Signals," which is incorporated herein by reference in its entirety, discloses various implementations of improved cable-based overlay systems used to deliver high-definition digital entertainment and telecommunications such as video, voice, and high-speed Internet services from a headend to subscribers.

The implementations of the improved overlay system disclosed in the '681 patent application operate to combine a digitally transported digitized narrowcast transmission with a broadcast transmission that is amplitude-modulated and transported on an analog optical link on a separate, dedicated fiber. Separate transport mechanisms for broadcast and narrowcast transmissions creates a need for more network resources and also results in a less than optimal use of a network system's bandwidth capabilities. Therefore, a need exists for improving methods and systems for delivering narrowcast and broadcast transmissions to a subscriber.

In general, a large amount of information is broadcast to an entire group of subscribers, and a relatively small fraction of information is narrowcast to small sub-groups of subscribers, wherein each sub-group (e.g., represented by a node or node port) receives narrowcast information that is unique to the sub-group. Typically, the delivery of a unique narrowcast transmission to a sub-group requires a narrowcast transmitter and an optical wavelength that is dedicated to the sub-group, and dedicated to said sub-group alone. For example, current optical architectures require at least one narrowcast transmitter and one optical wavelength per sub-group (e.g., node or node port). Therefore, a need exists for creating greater efficiency in the use of narrowcast transmitters and for allowing a narrowcast transmitter and an optical wavelength to serve more than one node or node port.

Typically, a CMTS transforms a signal into the time domain (e.g., using an inverse fast Fourier transform (IFFT)) before outputting the signal to a transmitter. The transformed signal is then transported to a transmitter and then output to a receiver. Transporting, re-transforming, and compressing data received from the CMTS requires a large amount of network and network component resources. Therefore, a need exists for improving the transport of data from a CMTS to a downstream component.

Generally, optical networks do not provide independent control or adaptation to individual channel amplitude and performance characteristics. This lack of control and resulting insufficient margins in forward and return traffic along the optical networks, can lead to the need for reserving large amounts of headroom to account for worst-case scenarios. Remote PHY (physical layer) architectures typically attempt to resolve the headroom issue by placing modulation and demodulation remotely at nodes. However, placing modulation and demodulation at nodes comes at the expense of a loss in transparency and of incompatibility with existing RF system components. Therefore, a need exists for improving forward and reverse transmissions through an optical fiber system.

Typically, return link transmitters are designed for a specific noise-to-power ratio (NPR) (e.g., 40 dB NPR) in a significant dynamic window (e.g., 15 dB dynamic window) to account for set up issues and to provide immunity from ingress clipping events. In embodiments, data inputs can be compressed such that NPR is maintained within a link capacity and within an associated dynamic window. For example, broadband companding is a lossy compression method that can be applied to limit bitrates in return transmitters. In embodiments, when ingress is present or when one or more channels are relatively strong compared to others, the noise of the companding process impacts the other channels (e.g., the weaker channels) and achievable modulation error ratio (MER) for the other channels is reduced. In practice, the 40 dB NPR is generally unavailable for weaker channels in the presence of strong channels when all are residing within the proper radio frequency (RF) level set-up window. Therefore, a need exists for improved data compression to support combining and transporting broadband compressed forward (BCF) and remote physical layer (R-PHY) channels.

BRIEF DESCRIPTION OF THE DRAWINGS

Like reference numbers and designations in the various drawings indicate like elements.

DETAILED DESCRIPTION

Figure 1:
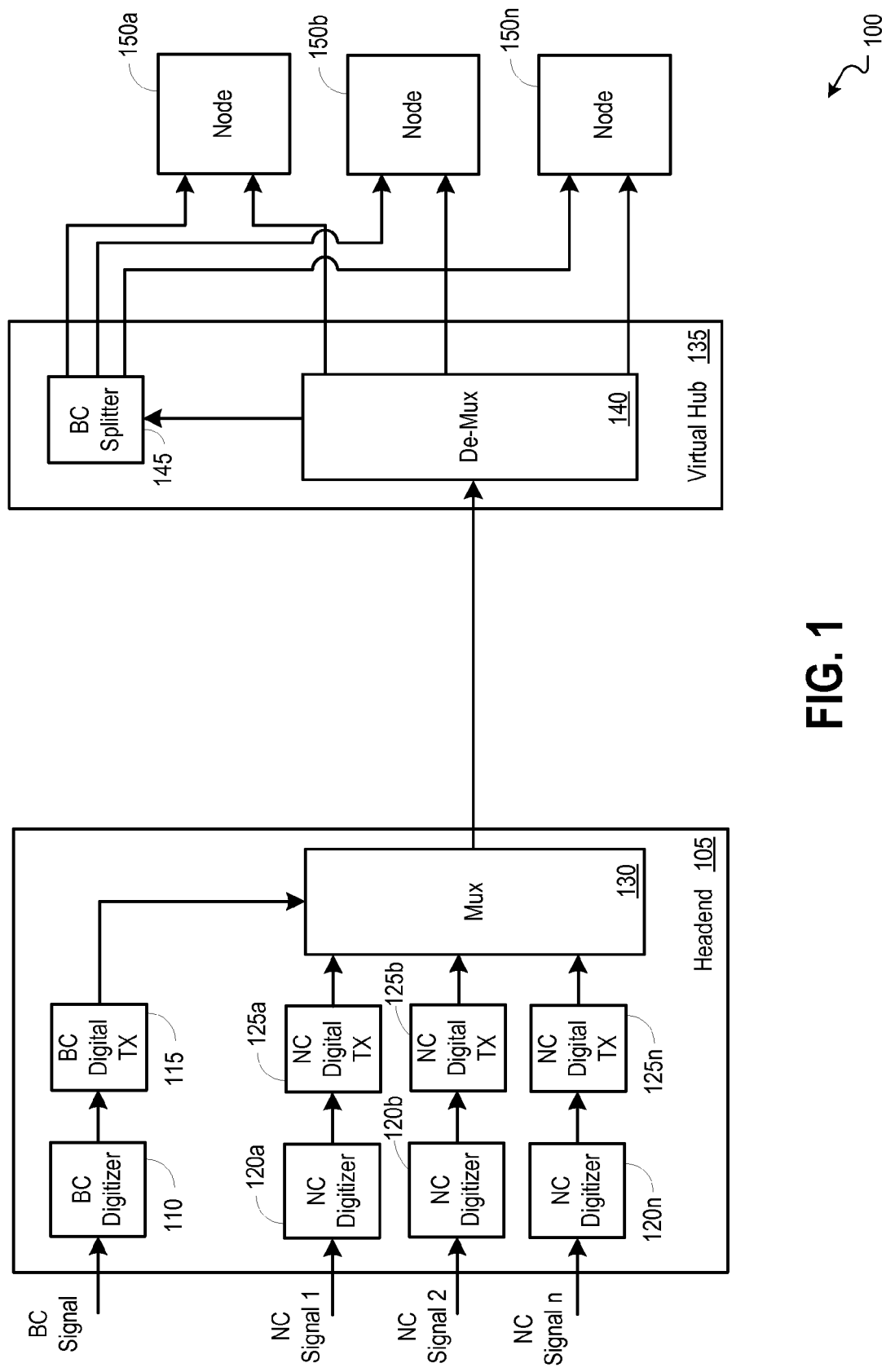
FIG. 1 is a block diagram illustrating an example network environment operable to facilitate converting an analog broadcast signal into a digital broadcast signal.

It is desirable to improve upon methods and systems for delivering narrowcast and broadcast transmissions to a subscriber. Methods and systems are described herein for digitizing a broadcast transmission and transporting the digitized broadcast transmission along with one or more digitized narrowcast transmissions to a subscriber. In embodiments, a digitized broadcast transmission and one or more digitized narrowcast transmissions can be separately demodulated and the transmissions can be combined at one or more receiving nodes. In embodiments, a digitized broadcast transmission can be combined with one or more digitized narrowcast transmissions.

Methods and systems described herein provide for network resource and hardware savings relative to analog broadcast/narrowcast overlay systems wherein the broadcast signal may be operated at high power and thus requiring a separate fiber. Digital links can operate at lower power levels than analog systems, and a greater number of wavelengths can be combined on a single fiber while providing allowance for fiber nonlinearity or optical component performance. Further, digital channels can be delivered at smaller bandwidths than analog channels, thus allowing more digital channels to be transported without increasing bandwidth capacity of the transport system.

In embodiments, individual forward and/or return channels can be isolated using sub-band coding. By isolating individual channels, data rates and compression parameters can be customized and set on a channel-by-channel basis. Further, specific broadcast channels can be mixed with specific narrowcast channels, and the channels can be targeted at one or more designated nodes.

Methods, systems, and apparatuses are described herein that are operable to facilitate controlling and adapting forward and return information on a per channel basis. In embodiments, broadband compressed forward (e.g., channels compressed downstream and received at a receiver) and remote PHY solutions (e.g., channels modulated at a receiver) can be combined on a per channel basis. In embodiments, forward and return information compression parameters can be shaped at a sub-band level, thus permitting needed transport capacity to be reduced. For example, the needed capacity in digitized RF solutions can be reduced. Methods, systems, and apparatuses described herein are operable to facilitate integration of broadband compressed forward and remote PHY solutions while supporting existing RF plant solutions.

In embodiments, lossless compression and de-compression techniques can be used to deliver digitized broadcast and narrowcast (e.g., channels dedicated for delivery of content to sub-groups) channels while remaining within network and system capabilities. For example, ultra high speed analog-to-digital and digital-to-analog converters, along with Huffman compression and de-compression techniques can be used to deliver a digitized full-spectrum forward data path.

In embodiments, a CMTS output stage is an IFFT. Both the IFFT input and the IFFT output includes the same information, but the information is represented in different domains (e.g., frequency/time domains). Therefore, in embodiments, a CMTS can provide the IFFT input data (e.g., pre-IFFT data that remains in the frequency domain) to a digital forward transmitter, thus bypassing multiple network components (e.g., CMTS IFFT, digital-to-analog (DA) converter, RF amplifiers and combiners, analog-to-digital (AD) converter and statistical compression at the digital forward transmitter, etc.). Separately transporting IFFT input from the CMTS to a transmitter can reduce the amount of equipment and resources used at a headend and can reduce the net data rate on a fiber because only the real data is transmitted, thus making a greater amount of bandwidth available.

In embodiments, a narrowcast transmitter, using frequency sub-band coding, can output a plurality of narrowcast signals to a plurality of sub-groups or nodes along a single optical link. The narrowcast transmitter can output the plurality of narrowcast signals as multiple slices of spectrum, wherein each slice of spectrum is designated for a particular sub-group or node. The narrowcast transmitter can further instruct each receiver or node as to which slice(s) of spectrum to use and at which frequency to output the associated narrowcast information to its intended subscribers. Spectrum slices may be directed at individual node ports, replicated at multiple node ports or may be turned off. Thus, a single transmitter can feed narrowcast information to multiple nodes or receivers along a single optical link.

In embodiments, frequency analysis and transformation back to the time domain of frequency analysis data can create discontinuities (e.g., increased impulse noise) at the boundaries of generated time domain waveforms based on sub-band coded information in the inverse transform. Therefore, a need exists for improving frequency analysis and back-transform techniques to limit discontinuities at such inverse transform boundaries. Methods, systems, and apparatuses described herein can facilitate leveling of sub-bands in the frequency domain, thereby reducing equalizing efforts and increasing channel capacity by reducing wasted bandwidth. Using a modulated lapped transform (MLT), one or more channels from a first input can be inserted into the spectrum of a second input, and the channel insertion can be accomplished without a significant amount of noise addition to the individual channel(s) and without impulse noise as would be created when using, for instance a fast Fourier transform (FFT) algorithm.

FIG. 1 is a block diagram illustrating an example network environment 100 operable to facilitate converting an analog broadcast signal into a digital broadcast signal and combining the digital broadcast signal with a digital narrowcast signal. In embodiments, a broadcast signal (e.g., BC signal) and one or more narrowcast signals (e.g., NC signals 1-$n$) are received at a headend 105. The broadcast and narrowcast signals can be received at the headend 105 as radio frequency (RF) signals.

In embodiments, a broadcast digitizer 110 digitizes a received analog broadcast signal and forwards the digitized broadcast signal to a broadcast digital transmitter 115. In embodiments, the analog broadcast signal is derived from digital bit streams that are quadrature amplitude modulation (QAM) encoded and modulated. Within the broadcast digitizer 110, a bandpass filter can filter the analog broadcast signal to filter out signals outside a predetermined frequency, and the resulting signal can be converted to a digital signal, for example, by an AD converter. The digital signal can be filtered further (e.g., through a bandpass filter), downconverted to a baseband signal (e.g., through a digital mixer), and low pass filtered to produce a digitized signal.

In embodiments, the broadcast digital transmitter 115 receives the digitized broadcast signal and converts the digitized broadcast signal to a broadcast optically modulated signal. For example, the broadcast signal can be modulated at a wavelength designated for broadcast signals.

In embodiments, one or more narrowcast digitizers 120*a-n* digitize the analog narrowcast signals and pass the digitized narrowcast signals onto corresponding narrowcast digital transmitter(s) 125*a-n*. In embodiments, the analog narrowcast signals are derived from digital bit streams that are QAM encoded and modulated. Within each narrowcast digitizer 120*a-n*, a bandpass filter can filter the analog narrowcast signal(s) to filter out signals outside a predetermined frequency range, and the resulting signal can be converted to a digital signal (e.g., through an AD converter). The digital signal can be filtered further (e.g., by a bandpass filter), down-converted to a baseband signal (e.g., by a digital mixer), and low pass filtered to produce a digitized narrowcast signal.

In embodiments, the digitized broadcast signal can have a frequency that is within a frequency band at the bottom of the forward RF spectrum. For example, for a 54 MHz-1002 MHz forward RF spectrum, the bottom range (e.g., 54-522 MHz) can be reserved for digitized broadcast signals and the upper range (e.g., 522-1002 MHz) can be reserved for digitized narrowcast signals. This disclosure is not limited to any particular digitizer, and any existing or future developed digitizer is intended to be included within the scope of this disclosure.

In embodiments, the one or more narrowcast digital transmitters 125*a-n* receive the one or more digitized narrowcast signals and convert the digitized narrowcast signals to narrowcast optically modulated signals. For example, each of the one or more narrowcast signals can be modulated at various wavelengths, each narrowcast signal being associated with a specific wavelength.

In embodiments, an optical multiplexer 130 combines (e.g., via dense wavelength division multiplexing) the broadcast optically modulated digital signal and the one or more narrowcast optically modulated digital signals produced by the broadcast digital transmitter 115 and narrowcast digital transmitters 125*a-n*, respectively, to produce a multi-wavelength optically modulated signal. In embodiments, the multi-wavelength optically modulated signal is output to a downstream virtual hub 135 along an optical fiber.

In embodiments, the broadcast and narrowcast signals can be sub-band filtered using transform based filtering (e.g., MLT), compressed using a lossless or lossy compression technique, and packed into a serial bit-stream sent to a receiver.

In embodiments, the multi-wavelength optically modulated signal can be received at a virtual hub 135. At the virtual hub 135, the multi-wavelength optically modulated signal can be demultiplexed by an optical demultiplexer 140. Demultiplexing of the multi-wavelength optically modulated signal can result in the isolation of the broadcast signal and the one or more narrowcast signals, and each of the one or more narrowcast signals can be output to a targeted node (e.g., node 150*a-n* that the narrowcast signal is to be delivered to). In embodiments, the broadcast signal and a narrowcast signal can be multiplexed and output to a designated node 150*a-n*. For example, the demultiplexer 140 can isolate the broadcast wavelength and one or more sub-groups of one or more narrowcast wavelengths. The broadcast wavelength can then be split and combined with each of the one or more sub-groups of narrowcast wavelengths, and the combined wavelength can be forwarded onto a designated node (e.g., nodes 150*a-n*).

In embodiments, the demultiplexed broadcast signal can be output to a broadcast splitter 145, and the broadcast splitter can output the broadcast signal to each of one or more nodes 150*a-n*. Each of the demultiplexed narrowcast signals can be isolated and can be output to a designated node 150*a-n*. In embodiments, each node 150*a-n* can convert received broadcast and/or narrowcast optically modulated signals to electrical signals. For example, nodes 150*a-n* can decode the received signals and recreate the original broadcast and narrowcast signals (e.g., the electrical broadcast and narrowcast signals as they were received at the headend 105). The nodes 150*a-n* can then transmit the electrical broadcast and/or narrowcast signals to a designated service group or subscriber. In embodiments, the signal received at the node can comprise multiple narrowcast signals and a broadcast signal, and the node can demultiplex the received signal and output each narrowcast signal, separate from the broadcast signal or combined with the broadcast signal, to a designated receiver.

Figure 2:
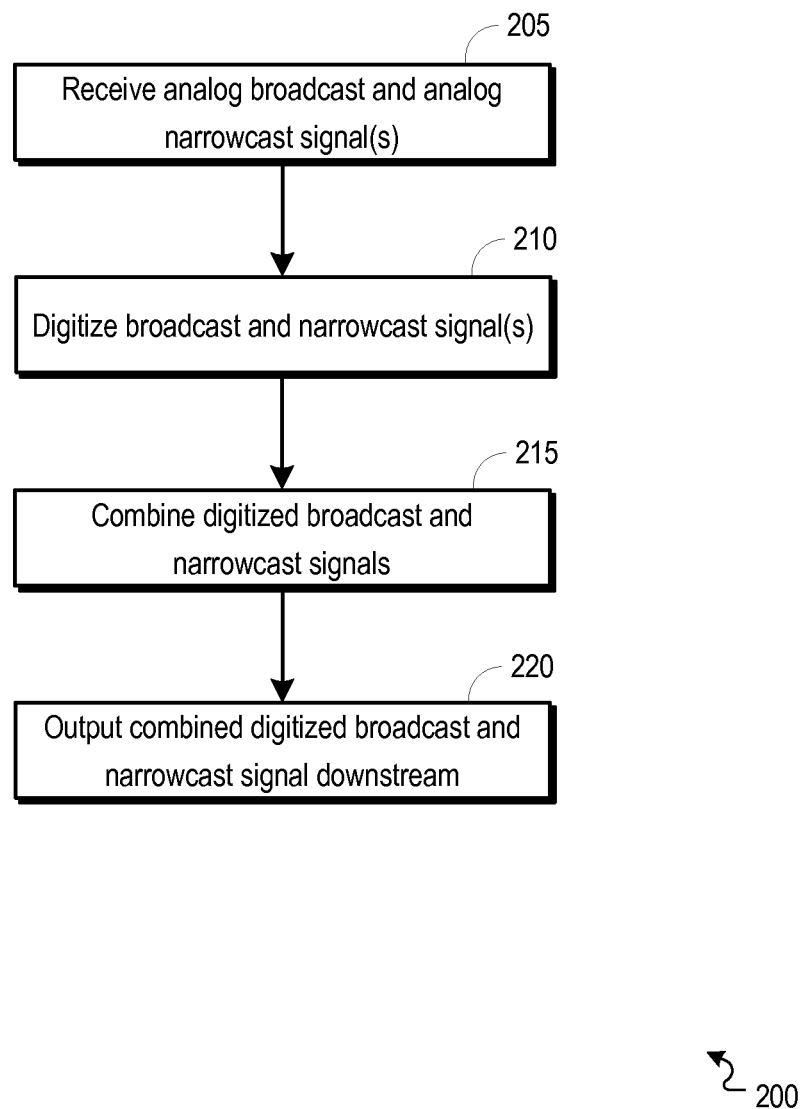
FIG. 2 is a flowchart illustrating an example process operable to facilitate converting an analog broadcast signal into a digital broadcast signal and combining the digital broadcast signal with one or more digital narrowcast signals.

FIG. 2 is a flowchart illustrating an example process 200 operable to facilitate converting an analog broadcast signal into a digital broadcast signal and combining the digital broadcast signal with one or more digital narrowcast signals. The process 200 can begin at 205 when an analog broadcast signal and one or more analog narrowcast signals are received at a headend (e.g., headend 105 of FIG. 1). In embodiments, each of one or more narrowcast signals received at the headend is targeted at a designated downstream component (e.g., node, service group, customer premise, etc.).

At 210, the analog broadband and analog narrowcast signals can be digitized. The analog signals can be digitized, for example, by one or more digitizers (e.g., broadcast digitizer 110 of FIG. 1 and narrowcast digitizer(s) 120*a-n* of FIG. 1 respectively). For example, the analog signals can be converted to digital signals and can be digitally filtered. In embodiments, the received analog broadcast and narrowcast signals are digitized and passed onto a corresponding digital transmitter (e.g., broadcast digital transmitter 115 of FIG. 1 or narrowcast digital transmitter 125*a-n* of FIG. 1). In embodiments, the digital transmitter can optically modulate a received signal, and can output the received signal at a particular wavelength.

At 215, the digitized broadcast and digitized narrowcast signals can be combined. The digitized broadcast and digitized narrowcast signals can be combined, for example, by a multiplexer (e.g., optical multiplexer 130 of FIG. 1). In embodiments, the optical multiplexer 130 combines (e.g., via dense wavelength division multiplexing) the digitized broadcast signal and the one or more digitized narrowcast signals produced by the broadcast digital transmitter 115 and narrowcast digital transmitters 125*a-n*, respectively, to produce a multi-wavelength RF optically modulated signal.

At 220, the combined digitized broadcast and narrowcast signals (e.g., the multi-wavelength RF optically modulated signal) can be output to corresponding downstream components. In embodiments, the combined digitized broadcast and narrowcast signals can be output along an optical fiber to a virtual hub 135 of FIG. 1. At the virtual hub 135, a demultiplexer 140 of FIG. 1 can de-multiplex the received multi-wavelength RF optically modulated signal and isolate the associated broadcast signal and individual narrowcast signals. In embodiments, the isolated broadcast signal can pass through a broadcast splitter 145 of FIG. 1 and can be output to one or more nodes 150*a-n*. Isolated narrowcast signals can be output to designated nodes 150*a-n*.

Figure 3:
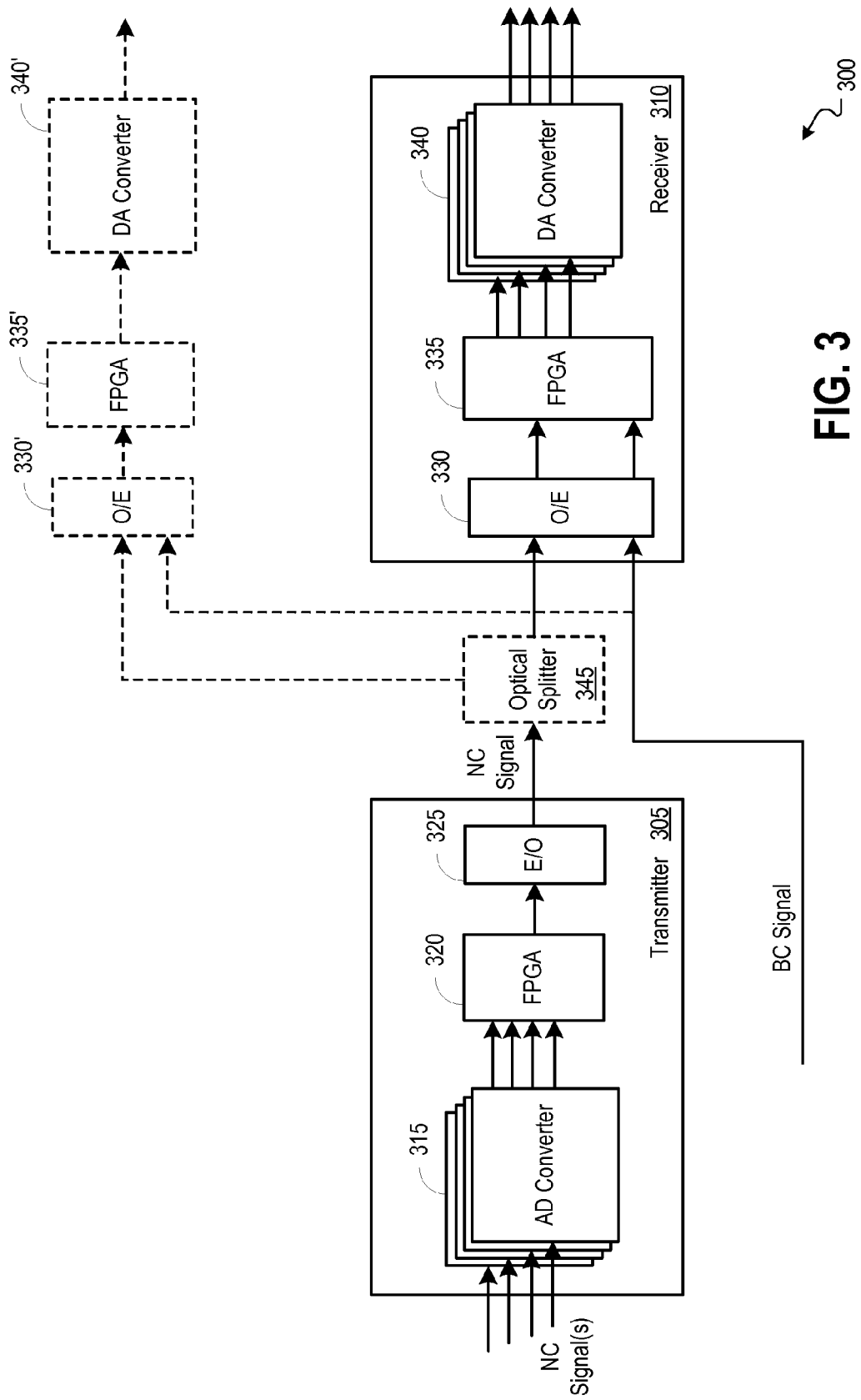
FIG. 3 is a block diagram illustrating an example network environment operable to facilitate transporting a plurality of narrowcast transmissions using a single transmitter.

FIG. 3 is a block diagram illustrating an example network environment 300 operable to facilitate transporting a plurality of narrowcast transmissions using a single transmitter. In embodiments, a transmitter 305 receives a plurality of narrowcast signals from an upstream network component or content sources. In embodiments, a plurality of narrowcast signals can be combined at a transmitter and output to one or more receivers 310 along a single optical link.

In embodiments, the transmitter 305 may include a plurality of analog-digital (AD) converters 315. Narrowcast signals can be received at the transmitter 305 as RF narrowcast signals and can be passed through the AD converters 315, thus generating a plurality of digital narrowcast signals.

Digital narrowcast signals can be passed to a field-programmable gate array (FPGA) 320. In embodiments, using a sub-band coding method, each of the received narrowcast signals can be associated with and spread over a plurality of frequency sub-bands. For example, a narrowcast signal can be segmented and each segment can be associated with a frequency sub-band. In embodiments, a frequency analysis (e.g., Fourier transform, modulated lapped transform (MLT), etc.) is performed on each of the received narrowcast signals, and the output of the frequency analysis can be represented in frequency sub-bands.

In embodiments, the FPGA 320 encodes sub-bands that contain information, such as a certain group or number of channels (e.g., QAM channels). In embodiments, the FPGA 320 can compress sub-bands into frames, and can output the compressed sub-bands to one or more receivers 310 along an optical link (e.g., a high-speed optical link). For example, the FPGA 320 can encode the narrowcast signals along with information identifying designated receivers and/or ports for each narrowcast signal, as well as information designating sub-band frequencies at which to output each narrowcast signal.

In embodiments, delivery information (e.g., identification of the one or more receivers, nodes, or ports that are targeted by the compressed sub-bands, identification of specific sub-bands designated for specific receivers and/or nodes, identification of the specific compression applied to the sub-bands, original and target frequencies, etc.) can be output along with the compressed sub-bands. For example, delivery information may include information allowing a downstream FPGA to reconstruct the narrowcast signals and output the narrowcast signals at designated sub-bands. The encoded narrowcast signals and delivery information can be passed through an electrical-optical (E/O) converter 325 and output along an optical fiber.

In embodiments, a receiver 310 can receive the compressed sub-bands along the optical link, and can identify one or more specific sub-bands that are designated for the receiver 310 (e.g., the sub-bands that include narrowcast information targeted at the receiver 310). A signal received along the optical link can be converted to an electrical signal at the receiver 310 by an optical-electrical (O/E) converter 330. An FPGA 335 can isolate the identified sub-bands (e.g., the sub-bands designated for the receiver) and can generate one or more narrowcast signals, each of the narrowcast signals being designated for a specific node. In embodiments, the FPGA 335 identifies specific, designated sub-bands and associates narrowcast signals with specific, designated nodes, based upon delivery information received from the transmitter 305.

In embodiments, the FPGA 335 can use delivery information received in the signal to reconstruct individual narrowcast signals. Delivery information can instruct the FPGA 335 to identify segments associated with an individual narrowcast signal, wherein the segments are delivered to the FPGA 335 at one or more different sub-band frequencies. Based on the delivery information, the FPGA 335 can identify one or more sub-band frequencies and reconstruct a narrowcast signal from the information carried by the sub-band frequencies.

In embodiments, the FPGA 335 at the receiver 310 can receive a broadcast signal. The FPGA 335 can combine the broadcast signal with each of the plurality of narrowcast signals and can output the multiple signal combinations to designated nodes. In embodiments, each narrowcast signal output from the FPGA 335 is passed through a digital-analog (DA) converter 340. The narrowcast signals can then be output to designated nodes as analog narrowcast signals. Decompression can be applied to selected sub-bands of a signal output from the FPGA 335 and an inverse transform can transform frequency domain sub-band information back into one or more time domain waveforms that are to be output at one or more ports from a corresponding node.

In embodiments, the FPGA 335 at the receiver 310 can identify a narrowcast signal or sub-band that is designated for a different FPGA or receiver (e.g., FPGA 335'). The FPGA 335 can isolate the narrowcast signal or sub-band designated for the FPGA 335' and can output the narrowcast signal or sub-band to the FPGA 335'. The FPGA 335' can then output one or more narrowcast signals through a DA converter 340' and onto a designated node. Thus, the transmitter 305 can deliver narrowcast signals that are designated for various different nodes and/or various different receivers.

In embodiments, an optical splitter 345 can identify designated receivers associated with sub-bands within an optical signal based on the wavelength at which the optical signal is transmitted. The optical splitter 345 can route information associated with the sub-bands transmitted at that wavelength to the designated receiver. For example, the optical splitter 345 can output information to a corresponding O/E converter (e.g., O/E 330 or O/E 330') where the signal can be converted from an optical to an electrical signal. Narrowcast signals can then be generated at a corresponding FPGA (e.g., FPGA 335 or FPGA 335'), and the narrowcast signals can be passed through a corresponding DA converter (e.g., DA converter 340 or DA converter 340'). In embodiments, a broadcast signal can be split and routed to a plurality of receivers and/or FPGAs.

Figure 4:
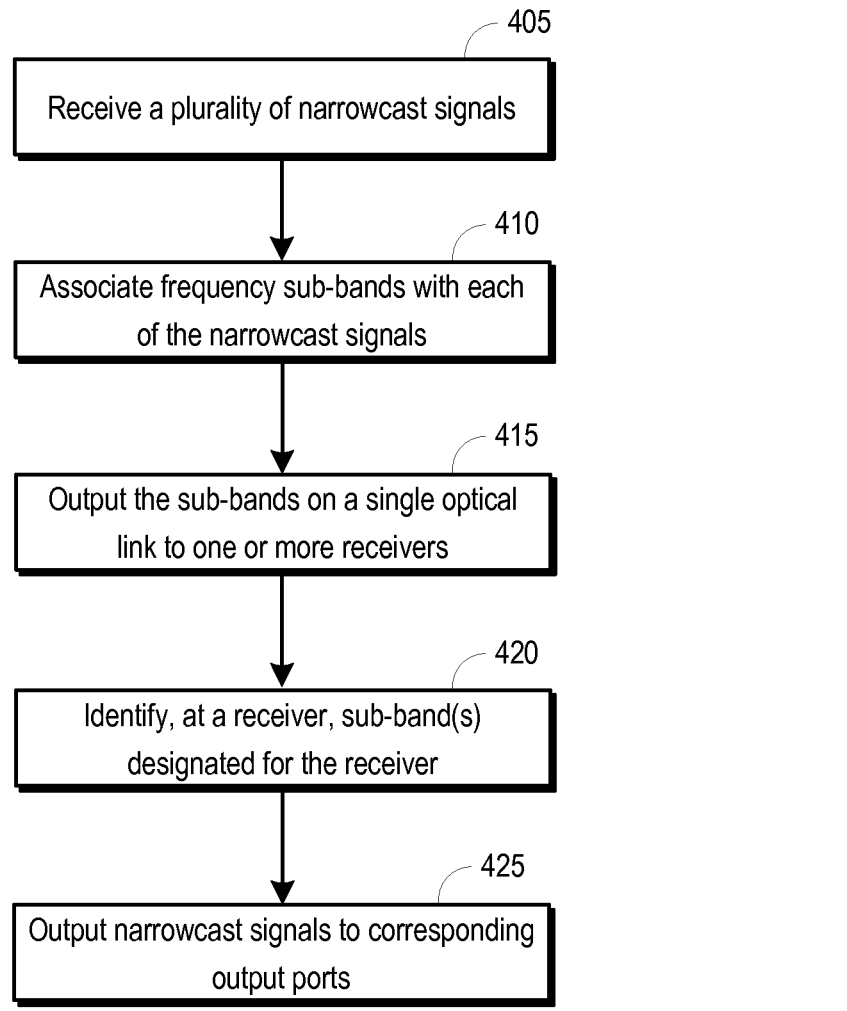
FIG. 4 is a flowchart illustrating an example process operable to facilitate transporting a plurality of narrowcast transmissions using a single transmitter.

FIG. 4 is a flowchart illustrating an example process 400 operable to facilitate transporting a plurality of narrowcast transmissions using a single transmitter. The process 400 can begin at 405 when a plurality of narrowcast signals is received at a transmitter (e.g., transmitter 305 of FIG. 3). In embodiments, narrowcast signals can be received at the transmitter 305 as RF narrowcast signals and can be passed through the AD converters 315 of FIG. 3, thus generating a plurality of digital narrowcast signals.

At 410, one or more frequency sub-bands can be associated with each of the received narrowcast signals. Frequency sub-bands can be generated, for example, by an FPGA 320 of FIG. 3. Using a sub-band coding method, each of the received narrowcast signals can be transformed into one or more frequency sub-bands. In embodiments, a frequency analysis (e.g., Fourier transform, modulated lapped transform (MLT), etc.) is performed on each of the received narrowcast signals, and the output of the frequency analysis can be represented in frequency sub-bands.

At 415, the sub-bands can be output to one or more receivers. In embodiments, the plurality of sub-bands can be combined at a transmitter (e.g., transmitter 305 of FIG. 3) and can be output to one or more receivers (e.g., receiver 310 of FIG. 3) on a single optical link or wavelength. In embodiments, sub-bands are compressed and serialized into frames, and are output to the one or more receivers 310 along an optical link (e.g., a high-speed optical link). In embodiments, delivery information (e.g., identification of the one or more receivers that are targeted by the compressed sub-bands, identification of specific sub-bands designated for specific receivers, nodes and/or ports, identification of the specific compression applied to the sub-bands, original and target frequencies, etc.) can be output along with the compressed sub-bands.

At 420, a receiver can identify sub-bands designated for the receiver. In embodiments, a receiver 310 of FIG. 3 can receive the compressed sub-bands along the optical link, and can identify one or more specific sub-bands that are designated for the receiver 310 (e.g., the sub-bands that include narrowcast information targeted at the receiver 310). An FPGA 335 of FIG. 3 at the receiver 310 can isolate the identified sub-bands (e.g., the sub-bands designated for the receiver), decompress the sub-band information, combine sub-band information into a frequency domain representation of one or more narrowcast signals, and use an inverse transform to transform the sub-band information from the frequency domain to the time domain (e.g., FFT, MLT) to generate one or more narrowcast signals, each of the narrowcast signals being designated for a specific node or node port. For example, the FPGA 335 can reconstruct narrowcast signals by combining segments of the narrowcast signals carried by one or more sub-bands. In embodiments, the FPGA 335 identifies specific, designated sub-bands and associates narrowcast signals with specific, designated nodes, based upon delivery information received from the transmitter 305 of FIG. 3.

At 425, narrowcast information can be output to associated output ports. In embodiments, a receiver can isolate digital narrowcast signals, can transform the digital signals into analog signals, and can output each of the narrowcast signals to targeted nodes. For example, the digital narrowcast signals can be output to a targeted node through a DA converter (e.g., DA converter 340 of FIG. 3). In embodiments, each narrowcast signal can be combined with a broadcast signal, and the combined narrowcast signal and broadcast signal can be output to a targeted node. In embodiments, the FPGA 335 at the receiver 310 can identify a narrowcast signal or sub-band that is designated for a different FPGA or receiver (e.g., FPGA 335' of FIG. 3). The FPGA 335 can isolate the narrowcast signal or sub-band designated for the FPGA 335' and can output the narrowcast signal or sub-band to the FPGA 335'.

Figure 5:
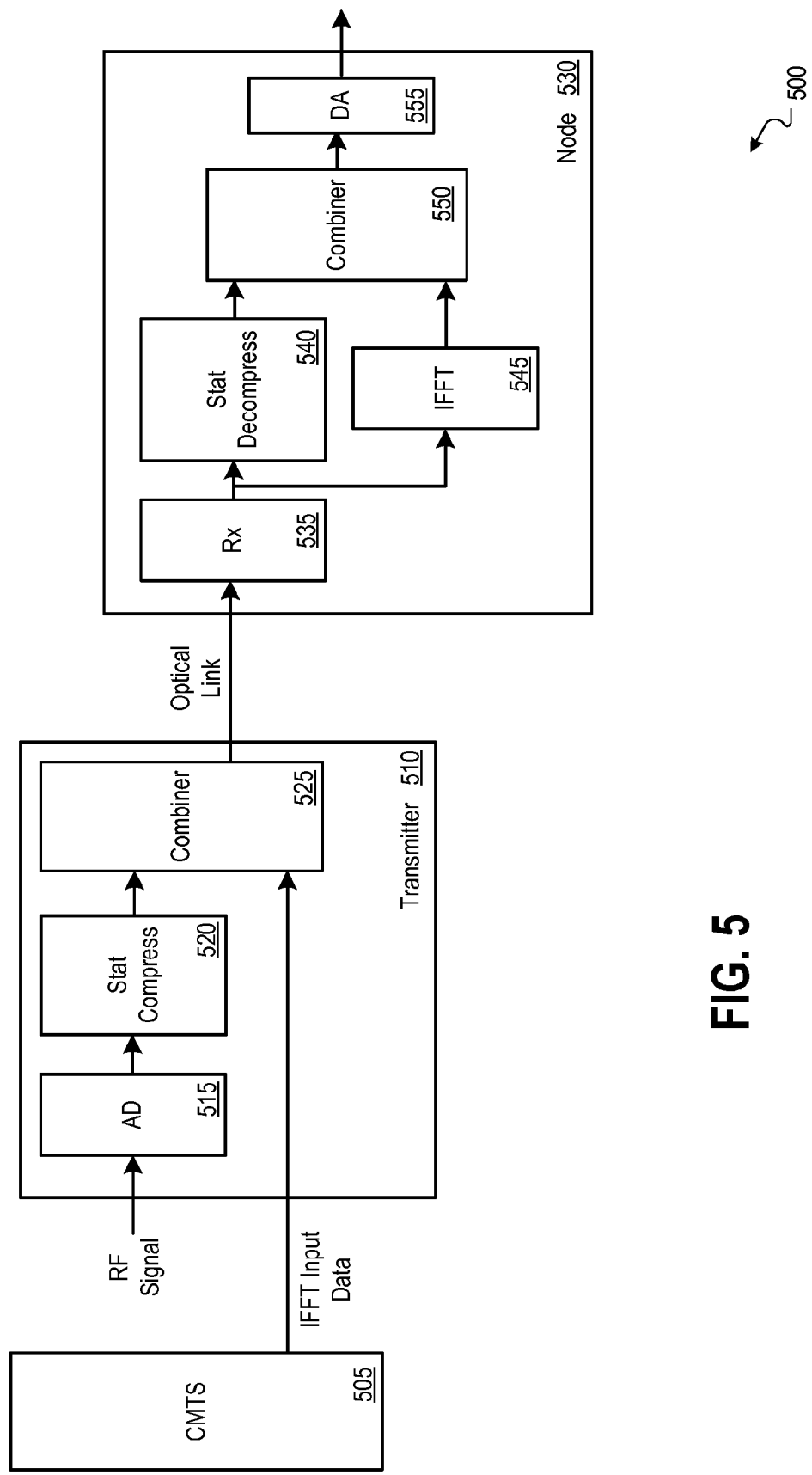
FIG. 5 is a block diagram illustrating an example network environment operable to facilitate the downstream transporting and processing of IFFT input data.

FIG. 5 is a block diagram illustrating an example network environment 500 operable to facilitate the downstream transporting and processing of IFFT input data. In embodiments, a CMTS output stage is an IFFT. Both the IFFT input and the IFFT output includes the same information, but the information is represented in different domains (e.g., frequency/time domains). Therefore, in embodiments, a CMTS can provide the IFFT input data (e.g., pre-IFFT data that remains in the frequency domain) to the digital forward transmitter, thus bypassing a CMTS IFFT, digital-analog (DA) converter, RF amplifiers and combiners, as well as AD converter and statistical compression at the digital forward transmitter. In embodiments, IFFT input data may include payload data and forward error correction (FEC) data.

Separately transporting IFFT input from the CMTS to a transmitter can reduce the amount of equipment and resources used at a headend and can reduce the net data rate on a fiber because only the real data is transmitted, thus making a greater amount of bandwidth available.

In embodiments, a CMTS 505 can identify data that is to be converted from the frequency domain to the time domain. The CMTS 505 can output identified IFFT input data (e.g., data designated for transformation from the frequency domain to the time domain) to a transmitter 510. In embodiments, identified IFFT input data can be output to the transmitter 510 as a digital stream, and can remain in the frequency domain.

In embodiments, an RF signal can be received by the transmitter 510. The RF signal may include content and associated data that is received from various upstream sources, and may be received as an analog signal. In embodiments, the RF signal can be digitized (e.g., converted from an analog signal to a digital signal) by passing the RF signal through an AD converter 515. In embodiments, the digitized signal can then be sub-band filtered and compressed at a statistical compressor 520.

In embodiments, IFFT input data can be received by the transmitter 510 at a combiner 525, thus bypassing the AD converter 515 and statistical compressor 520. In embodiments, the compressed, digitized signal can be combined with the IFFT input data at the combiner 525, and the resulting aggregate signal can be output to a node 530. For example, the signal can be output on an optical fiber.

In embodiments, the aggregate signal can be received at the node 530 by a receiver 535. The receiver 535 can identify and separate the digitized signal and the IFFT input data from the aggregate signal. In embodiments, the digitized signal can be decompressed, and when sub-band coding has been applied at the transmitter, an inverse transform can be applied at a statistical decompressor 540. In embodiments, the IFFT input data can be passed through an IFFT 545 where the IFFT input data can be transformed to the time domain. The IFFT output (e.g., the IFFT input data represented in the time domain) and decompressed digitized signal can be combined by a combiner 550 and the combined signal can be converted from a digital signal to an analog signal by a DA converter 555. In embodiments, the combined analog signal can then be output downstream to a designated subscriber group or customer premise.

Figure 6:
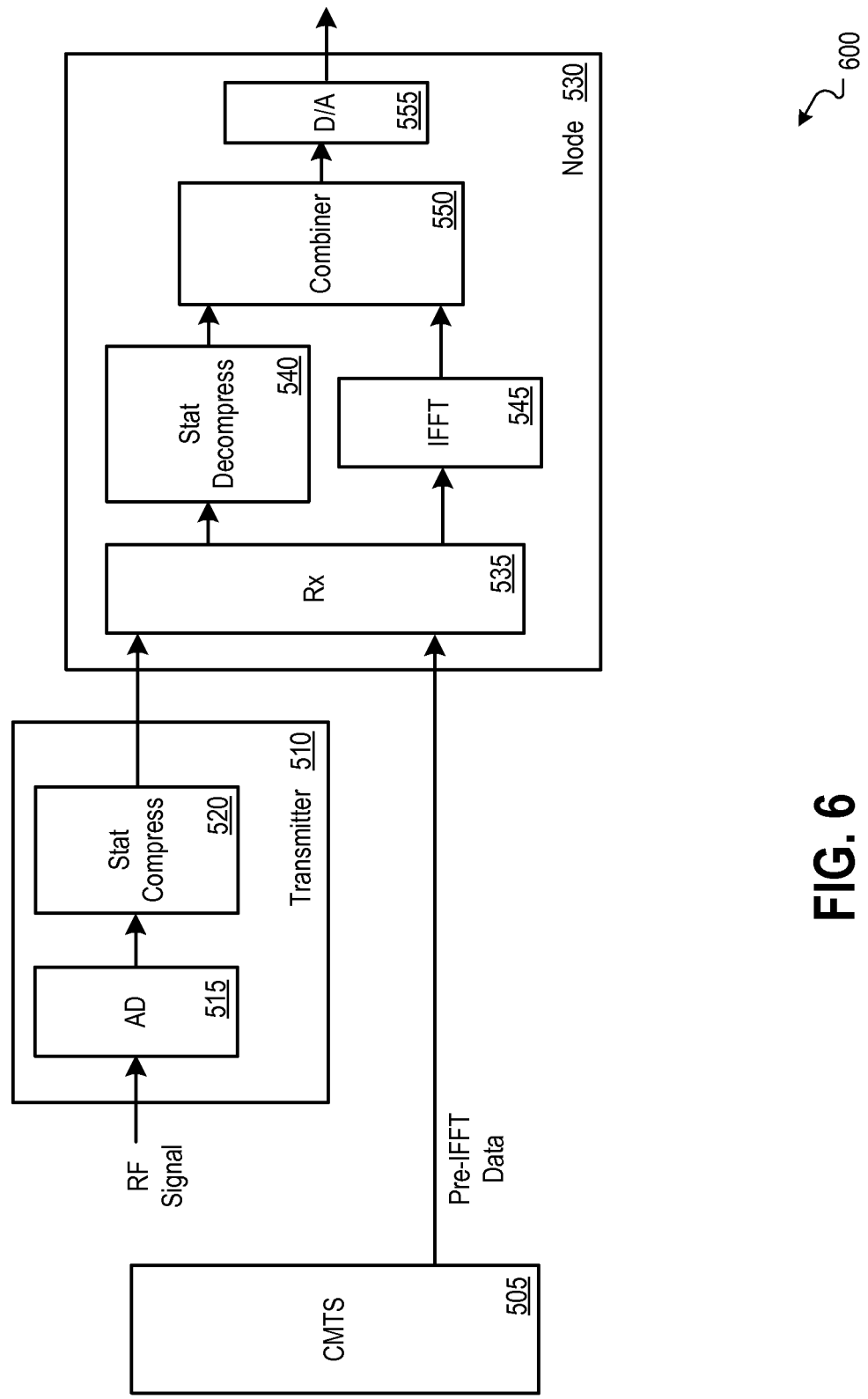
FIG. 6 is a block diagram illustrating an example network environment operable to facilitate the downstream transporting and processing of IFFT input data.

FIG. 6 is a block diagram illustrating an example network environment 600 operable to facilitate the downstream transporting and processing of IFFT input data. In embodiments, a CMTS 505 can provide the IFFT input data (e.g., pre-IFFT data that remains in the frequency domain) to the node 530, thus bypassing a CMTS IFFT, digital-analog (DA) converter, RF amplifiers and combiners, as well as AD conversion and statistical compression at the digital forward transmitter. In embodiments, the CMTS 505 can identify data that is to be converted from the frequency domain to the time domain. The CMTS 505 can output identified IFFT input data (e.g., data designated for transformation from the frequency domain to the time domain) to a node 530. In embodiments, identified IFFT input data can be output to the node 530 as a digital stream, and can remain in the frequency domain.

In embodiments, an RF signal can be received by the transmitter 510. The RF signal may include content and associated data that is received from various upstream sources, and may be received as an analog signal. In embodiments, the RF signal can be digitized (e.g., converted from an analog signal to a digital signal) by passing the RF signal through an AD converter 515. In embodiments, the digitized signal can then be compressed at a statistical compressor 520. The digitized signal can be output to the node 530 along an optical fiber.

In embodiments, the digitized signal and the IFFT input data can be received at the node 530 by a receiver 535. The receiver 535 can output the digitized signal to a statistical decompressor 540 and can output the IFFT input data to an IFFT filter 545. In embodiments, the digitized signal can be decompressed at the statistical decompressor 540. In embodiments, the IFFT input data can be passed through the IFFT 545 where the IFFT input data can be transformed to the time domain. The IFFT output (e.g., the IFFT input data represented in the time domain) and decompressed digitized signal can be combined by a combiner 550 and the combined signal can be converted from a digital signal to an analog signal by a DA converter 555. In embodiments, the combined analog signal can then be output downstream to a designated subscriber group or customer premise.

In embodiments, broadband compressed forward (e.g., channels compressed upstream and received at a receiver) and remote PHY solutions (e.g., channels modulated at a receiver) can be combined on a per channel basis. In embodiments, forward and return information compression parameters can be shaped at a sub-band level, thus permitting the size of set-up windows to be reduced. By reducing the size of set-up windows, the headroom needed in digitized RF solutions can likewise be reduced. Methods, systems, and apparatuses described herein are operable to facilitate integration of broadband compressed forward and remote PHY solutions while supporting existing RF plant solutions.

In embodiments, sharp filters can be used to select single channels within an RF spectrum. For example, an RF signal can be received at the transmitter 510 and can be digitized by the AD converter 515. In embodiments, the digitized signal can be filtered and divided into a number of individual sub-bands. For example, the digitized signal can be filtered and divided into sub-bands by an FPGA 320 of FIG. 3. In embodiments, each sub-band can be controlled individually, thereby allowing single channels to be isolated (e.g., single DOCSIS3.0/3.1 QAM channels, single AM-VSB channel, etc.). A low speed communication channel can be embedded in a data stream, wherein the communication channel provides a table including the destinations of individual sub-bands. In embodiments, multiple destinations can be associated with each sub-band to facilitate broadcasting of the same information to any node connected to the same optical fiber link.

In embodiments, digitized RF channels can be selected on a per-channel basis, and the channels can be placed at arbitrary output channel frequencies. For example, an FPGA 320 of FIG. 3 can select individual channels and can output the channels at arbitrary outputs. The FPGA 320 can thereby generate channel combinations in signals that are customized for individual receiving nodes and/or ports.

In embodiments, a sub-band filter can cover a full spectrum (e.g., 0-1.4 GHz of RF spectrum), such that channels of any type (e.g., broadcast, narrowcast, etc.) can be selected and directed to target nodes. Selected RF spectrum channels can be mixed with R-PHY channels. For example, RF channels and R-PHY channels can be combined at an FPGA 320 of FIG. 3.

In embodiments, BCF methods can be embodied in a broadband compressed return (BCR) transmitter. A BCR transmitter can compand data on a sub-band level, thereby providing a constant SNR in each sub-band over a wide input range without effecting adjacent, weaker channels (or sub-bands). Therefore, using such a BCR transmitter, additional headroom bit-capacity is not required for ingress immunity, whereas adjacent channels do not suffer when ingress occurs at a channel. In embodiments, the low band (e.g., 5-15 MHz) does not need encoding with very high SNR, as they do not support high order modulation formats, and the compander function can be set aggressively in the low-band, thereby reducing the required bit rate without any impact on the MER of other frequency bands.

In embodiments, a transmitter (e.g., transmitter 510) can establish a specific data rate for each channel, the data rate being such that one or more performance requirements can be supported by the specific data rate. The data rate can be established, for example, by an FPGA 320 of FIG. 3. Individual BCF channels can be isolated using sub-band coding methods, and BCF channels can be mixed with R-PHY channels. For example, where each channel is associated with one or more sub-bands, individual sub-bands associated with a channel can be identified and isolated such that individual channels can be manipulated. In embodiments, the combined BCF channels and R-PHY channels can be output and targeted to any one of multiple nodes.

In embodiments, a transmitter (e.g., transmitter 510) can apply compression and data rate parameters to individual return channels. Compression and data rate parameters can be applied, for example, by an FPGA 320 of FIG. 3. In embodiments, sub-band coding methods can be used to create an optimized return system by establishing compression and data rate parameters that are optimized for each individual return channel.

Figure 7:
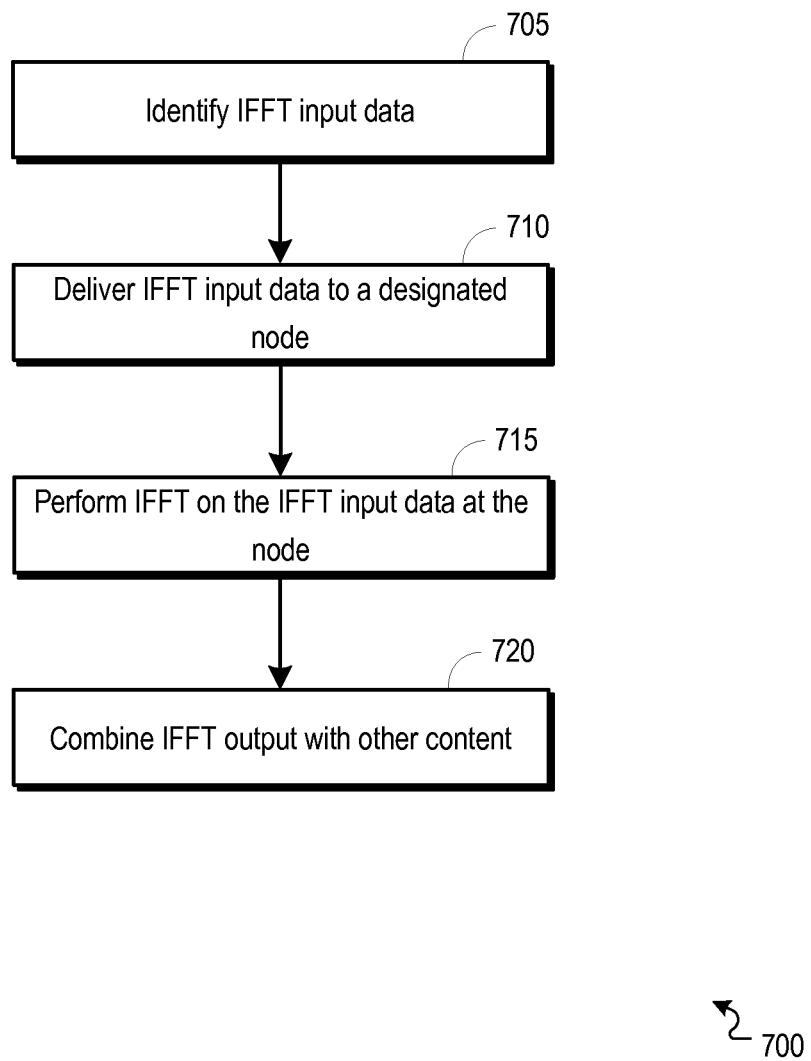
FIG. 7 is a flowchart illustrating an example process operable to facilitate the downstream transporting and processing of IFFT input data.

FIG. 7 is a flowchart illustrating an example process 700 operable to facilitate the downstream transporting and processing of IFFT input data. The process 700 can begin at 705 when IFFT input data is identified at a headend. In embodiments, a CMTS 505 of FIG. 5 can identify IFFT input data (e.g., data that is to be converted from the frequency domain to the time domain).

At 710, the identified IFFT input data can be delivered to a designated node. For example, the IFFT input data can be delivered to a node 530 of FIG. 5 as a digital signal and remaining in the frequency domain. In embodiments, the IFFT input data can be output from a CMTS 505 to a transmitter (e.g., transmitter 510 of FIG. 5), combined with digitized content (e.g., content received as an RF signal at the transmitter and digitized at the transmitter), and output from the transmitter to the designated node 530. In embodiments, the IFFT input data can be output from the CMTS 505 to the designated node 530. For example, the IFFT input data can be received by a receiver 535 at the node 530, and the receiver 535 can receive other data from a transmitter 510.

At 715, an IFFT can be performed on the IFFT input data. An IFFT can be performed on IFFT input data, for example, by an IFFT 545 of FIG. 5 at a node 530 of FIG. 5. In embodiments, IFFT input data can be separated from a combined signal (e.g., a combined signal including IFFT input data and a digitized signal) at a receiver 535, and the IFFT input data can be output to an IFFT 545. The IFFT 545 can transform the IFFT input data from the frequency domain to the time domain.

At 720, the IFFT output can be combined with other digitized content. In embodiments, the IFFT output (e.g., the IFFT input data that has been transformed to the time domain) can be combined with other digitized content at a combiner 550 of FIG. 5. In embodiments, the combined IFFT output and digitized content can be converted to an analog signal (e.g., by DA converter 555 of FIG. 5) and the combination of the IFFT output and digitized content can be converted to an analog signal. The IFFT output and digitized content can be converted to an analog signal, for example, by a DA converter 555 of FIG. 5, and the analog signal can be output to a designated downstream target.

Figure 8:
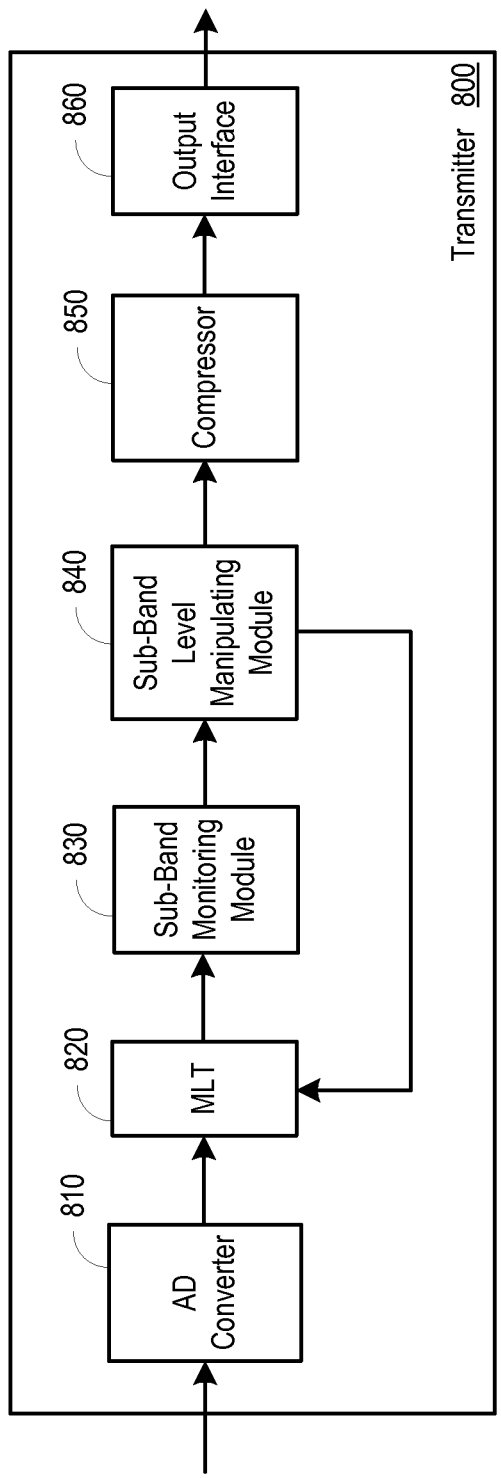
FIG. 8 is a block diagram illustrating an example transmitter operable to facilitate sub-band coding, monitoring, and compression.

FIG. 8 is a block diagram illustrating an example transmitter 800 operable to facilitate sub-band coding, monitoring, and compression. In embodiments, a transmitter 800 may include an AD converter 810, a MLT 820, a sub-band monitoring module 830, a sub-band level manipulating module 840, a compressor 850, and an output interface 860. The transmitter 800 can receive analog narrowcast signals, broadcast signals, or both, and the analog signals can be converted to digital signals at the AD converter 810. In embodiments, where a transmitter is integrated in a CMTS, a digitized waveform may be provided directly to the MLT 820, without first being converted to an RF signal at the CMTS and re-digitized by the AD converter 810.

In embodiments, methods, systems, and apparatuses can facilitate leveling of sub-bands in the frequency domain, thereby reducing equalizing efforts and increasing channel capacity by reducing wasted bandwidth. Using an MLT, one or more channels from a first input can be inserted into the spectrum of a second input, and the channel insertion can be accomplished without a significant amount of noise addition to the individual channel(s).

In embodiments, the digital signal can be encoded using an MLT at the MLT 820. Signals can be filtered at the MLT 820. For example, each frequency domain MLT coefficient permits phase and amplitude manipulation to create an arbitrary filter response. Thus pre-programmed filter responses can be created and applied, and adaptive filters can be created and applied through a software interface.

In embodiments, sub-band levels can be monitored and/or adjusted by the transmitter 800. Sub-band levels can be monitored by the sub-band monitoring module 830. For example, the sub-band monitoring module 830 can monitor amplitude and phase of received signals. The sub-band level manipulating module 830 can recognize when adjustments need to be made to corresponding MLT coefficients based on the sub-band levels monitored at the sub-band monitoring module 830. In embodiments, the sub-band level manipulating module 840 can adjust MLT coefficients at the MLT 820 based upon amplitude and phase levels monitored by the sub-band monitoring module 830.

In embodiments, the transmitter 800 can output sub-band levels (e.g., as measured by the sub-band monitoring module 830) to an upstream or downstream device, such as a device or server used to monitor the transmitter 800. For example, an MSO or user can monitor and adjust MLT coefficients at the MLT 820 based on the information received from the transmitter 800.

In embodiments, the transmitter 800 can use the MLT 820 to manipulate both amplitude and phase on a fine frequency scale to tune out amplitude and/or phase errors. In embodiments, MLT coefficients can be set at the MLT 820 based upon feedback received from an external network monitoring device or server. For example, MLT coefficients can be set based upon equalizer corrections reported by a network monitoring device or server. Information associated with signal levels as transmitted by a headend and/or received by modems can be gathered and used to level sub-bands at the transmitter 800. In embodiments, MLT coefficients can be based upon a preset correction value. For example, MLT coefficients can be preset to account for a certain percentage of amplitude and/or phase errors that accumulate through network components (e.g., an amplifier chain in the field).

In embodiments, noise spikes at transform boundaries due to quantizing the transformed data at the transmitter 800 are prevented by using a transform method with overlapping transforms such as the MLT instead of using transforms that are not overlapping such as an FFT. With non-overlapping transforms, discontinuities occur at boundaries of waveform sections recovered from inverse transforms. Such discontinuities can be understood as jumps in signal level that are equivalent to impulse noise. Whereas FFT methods can provide a proper signal to noise ratio, the signal to noise ratio only provides that the average signal to noise is acceptable. Impulse noise occurs with an amplitude much greater than would be expected based on Gaussian statistics and causes bit errors in signals that are represented by the output waveforms (e.g., QAM signals). Using the MLT transform, such discontinuities do not occur and the MLT can facilitate sub-band coding and quantization of arbitrary RF signals in order to obtain an acceptable performance free of impulse noise. It should be understood that MLT operations can occur in transmitters (e.g., transmitter 305) and in receivers (e.g., receiver 310).

In embodiments, signals can be compressed at the compressor 850 and output to a receiving node (e.g., receiver 310 of FIG. 3) through the output interface 860. Transporting digitized broadcast and narrowcast signals may be limited by various network resources. For example, optical fiber links have a maximum payload capacity. A/D and D/A converters (e.g., AD converter 515, DA converter 555) have certain sample sizes and sample rates for accurately and efficiently converting a signal. Therefore, a need exists for improved methods, systems, and apparatuses for transporting digitized broadcast and narrowcast signals along an optical fiber while providing A/D and D/A converters with a sufficient sample size and sample rate.

In embodiments, compression techniques can be used to facilitate the reduction of required payload capacity associated with a digitized full-spectrum forward path. A digitized signal can be compressed using a lossless compression technique (e.g., Huffman coding). Such techniques can preserve end-to-end signal integrity, as indicated by performance measures (e.g., carrier-to-noise ratio (CNR), signal-to-noise ratio (SNR), noise-power-ratio (NPR), etc.). At a receiving node (e.g., receiver 310 of FIG. 3), a corresponding de-compression technique (e.g., Huffman decoding) can be used to reconstruct the original signal spectrum using an ultra-high speed D/A converter.

In embodiments, one or more compression techniques can be used to compress a digitized forward signal to a size that is appropriate for a corresponding optical fiber. For example, a high-speed AD converter can be used to convert a forward electrical data stream to a digital signal, the digital signal can be compressed using Huffman coding techniques, and the compressed digital signal can be output along an optical fiber to a receiving node. In embodiments, a compressed digital forward signal can be de-compressed at a receiving node using Huffman de-compression, and the de-compressed digital signal can be converted to an analog signal using a high-speed DA converter.

In embodiments, Huffman compression of a digital signal can use the statistical distribution of the digital signal values to reduce the number of bits transmitted along an optical link. A "code-book" can be created for the digital signal, wherein a one-to-one mapping exists between all possible signal values and a set of code-words that can be transmitted in place of each sample value. The code-words can be variable in length, and the most probable signal values can be assigned to the shortest code words, while the least probable signal values can be assigned to the longest code words. In embodiments, for a signal with a distribution of sample values that are Gaussian, for example, a significant reduction in bit rate can be achieved using Huffman compression.

In embodiments, Huffman compression of a digital signal generates a set of codes that does not contain pre-fixes, thus shorter code-words cannot be construed as a prefix, or beginning, of a longer code-word. Using a set of codes without pre-fixes can allow for a simpler decoding algorithm to be used at the receiving node.

In embodiments, the upper bits of each data sample can be compressed, and the lower bits of each sample can be transmitted uncompressed. Compression of the upper bits of each sample can result in more efficient bit reduction, while transmitting the lower bits of each sample without compressing the lower bits can allow for simpler and more efficient decompression at a receiving node. For example, a smaller codebook can be used if the lower bits of each sample are left uncompressed.

Figure 9:
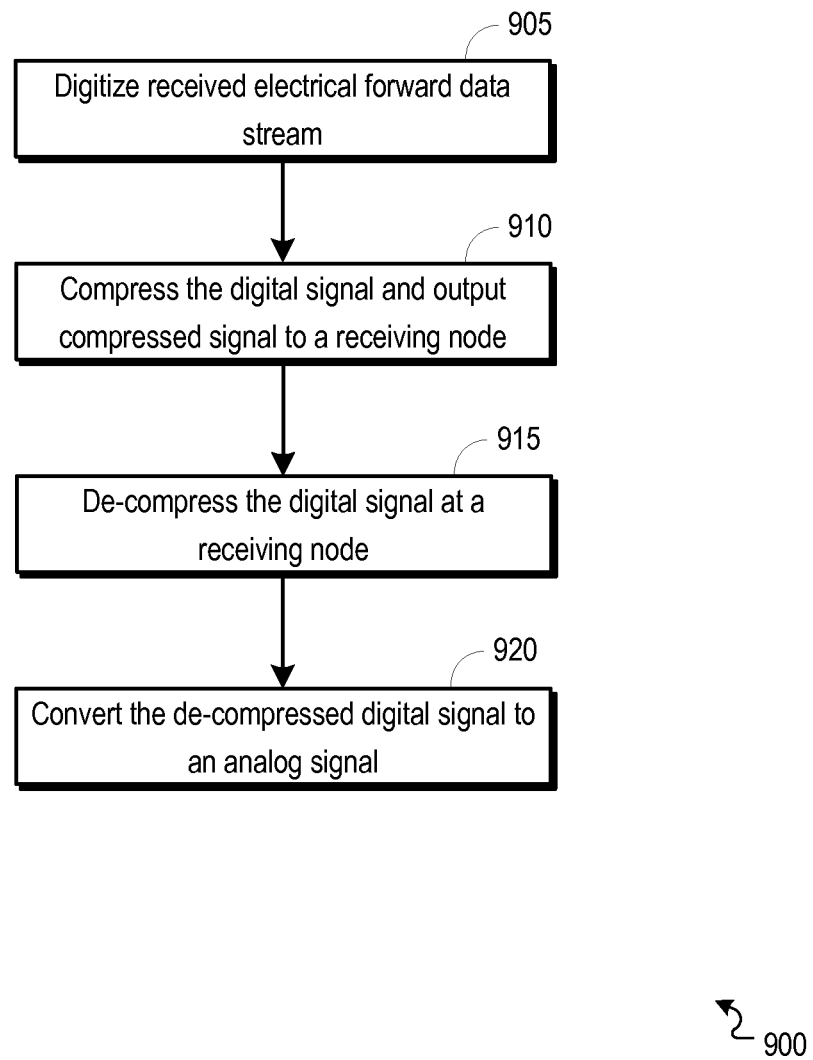
FIG. 9 is a flowchart illustrating an example process operable to facilitate transporting compressed digital forward signals along one or more optical links.

FIG. 9 is a flowchart illustrating an example process 900 operable to facilitate transporting compressed digital forward signals along one or more optical links. The process 900 can begin at 905 when one or more received electrical forward data streams are digitized. In embodiments, the electrical forward data streams are digitized by an AD converter (e.g., AD converter 515 of FIG. 5) at a transmitter (e.g., transmitter 510 of FIG. 5). For example, the AD converter 515 of FIG. 5 can be an ultra-high-speed AD converter.

At 910, the digital signal can be compressed and output to a receiving node. In embodiments, the digital signal that is output from the AD converter 515 can be compressed at the statistical compressor 520 of FIG. 5. For example, the digital signal can be compressed using a lossless compression technique (e.g., Huffman coding). In embodiments, the statistical compressor 520 can be an FPGA. After the digital signal is compressed, the compressed signal can be output along an optical fiber to a receiving node (e.g., node 530 of FIG. 5).

At 915, the compressed digital signal can be de-compressed at a receiving node (e.g., node 530 of FIG. 5). In embodiments, the compressed digital signal can be de-compressed at the statistical de-compressor 540 of FIG. 5. For example, the digital signal can be de-compressed using a de-compression technique corresponding with the compressed signal (e.g., Huffman de-compression). In embodiments, the statistical de-compressor 540 can be an FPGA.

At 920, the de-compressed digital signal can be converted to an analog signal. The de-compressed digital signal can be converted to an analog signal, for example, by the DA converter 555 of FIG. 5. In embodiments, after the de-compressed signal is converted to an analog signal, the analog signal can be output to a downstream network component.

Figure 10:
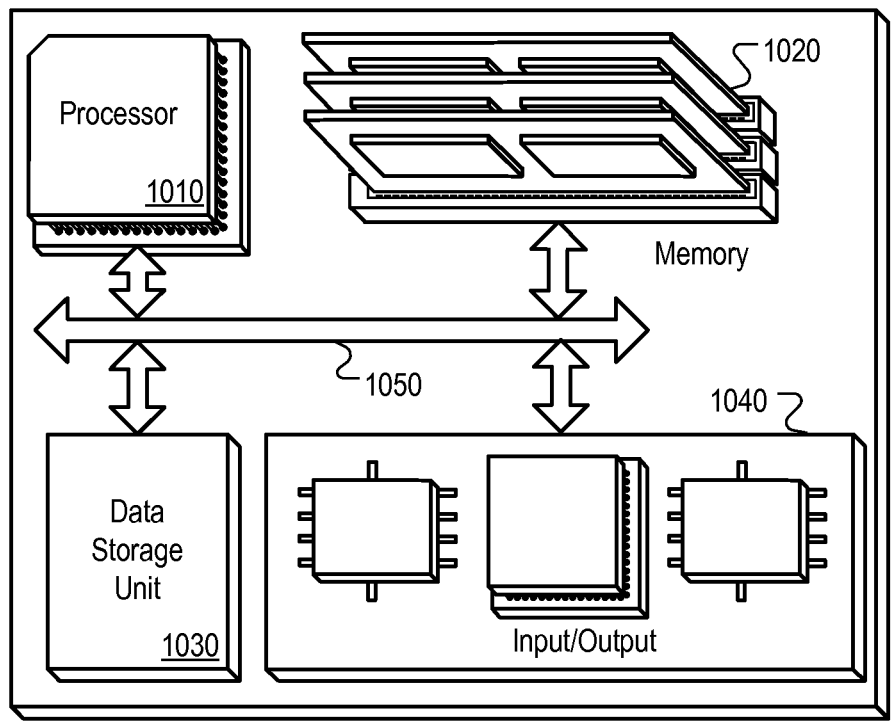
FIG. 10 is a block diagram of a hardware configuration operable to facilitate the transport of broadband digital forward data.

FIG. 10 is a block diagram of a hardware configuration 1000 operable to facilitate the transport of broadband digital forward data. The hardware configuration 1000 can include a processor 1010, a memory 1020, a storage device 1030, and an input/output device 1040. Each of the components 1010, 1020, 1030, and 1040 can, for example, be interconnected using a system bus 1050. The processor 1010 can be capable of processing instructions for execution within the hardware configuration 1000. In one implementation, the processor 1010 can be a single-threaded processor. In another implementation, the processor 1010 can be a multi-threaded processor. The processor 1010 can be capable of processing instructions stored in the memory 1020 or on the storage device 1030.

The memory 1020 can store information within the hardware configuration 1000. In one implementation, the memory 1020 can be a computer-readable medium. In one implementation, the memory 1020 can be a volatile memory unit. In another implementation, the memory 1020 can be a non-volatile memory unit.

In some implementations, the storage device 1030 can be capable of providing mass storage for the hardware configuration 1000. In one implementation, the storage device 1030 can be a computer-readable medium. In various different implementations, the storage device 1030 can, for example, include a hard disk device, an optical disk device, flash memory or some other large capacity storage device. In other implementations, the storage device 1030 can be a device external to the hardware configuration 1000.

The input/output device 1040 provides input/output operations for the hardware configuration 1000. In embodiments, the input/output device 1040 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for providing video, data, and/or voice services to a client device and/or a customer premise equipment device. In embodiments, the input/output device 1040 can include driver devices configured to send communications to, and receive communications from one or more networks (e.g., local area network, wide area network, optical fiber network, hybrid-fiber coaxial network, etc.).

Those skilled in the art will appreciate that the invention improves upon methods and systems for transporting broadcast signals. Digitizing broadcast signals allows the end-of-line SNR performance to be independent of transport distance or link length. Further, a digitized broadcast signal can be transported on the same optical fiber as one or more digitized narrowcast signals, thereby eliminating the need for multiple fibers. Lossless compression and de-compression techniques, along with ultra-high speed AD converters can be used to optimally transport digitized broadcast and narrowcast signals.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving an analog broadcast signal;
   receiving one or more analog narrowcast signals;
   converting the analog broadcast signal into a digital broadcast signal;
   converting the one or more analog narrowcast signals into digital narrowcast signals;
   combining the digital broadcast signal and the one or more digital narrowcast signals, thus generating a single output signal, wherein combining the digital broadcast signal and the one or more digital narrowcast signals comprises associating each respective one of the one or more digital narrowcast signals with one or more sub-bands by performing a frequency analysis on the respective one digital narrowcast signal; and
   outputting the single output signal to a downstream network component.

2. The method of claim 1, wherein the single output signal is output on an optical fiber.

3. The method of claim 2, wherein the single output signal is output at a single wavelength.

4. The method of claim 1, wherein the digital broadcast and the one or more digital narrowcast signals are combined through dense wavelength division multiplexing.

5. The method of claim 1, wherein the single output signal is compressed using a lossless compression technique.

6. The method of claim 5, wherein the lossless compression technique comprises Huffman coding.

7. A method comprising:
   receiving a digital signal, wherein the digital signal comprises a digital broadcast signal and one or more digital narrowcast signals;
   separating the broadcast digital signal and the one or more narrowcast signals from the received digital signal;
   outputting each of the one or more narrowcast signals to one or more designated downstream nodes, wherein a designated downstream node associated with a narrowcast signal is identified based upon a determination that a sub-band carrying the narrowcast signal is associated with the downstream node; and
   outputting the broadcast signal to one or more downstream nodes.

8. The method of claim 7, wherein the received digital signal is an optical signal.

9. The method of claim 7, wherein the received digital signal is de-compressed using a lossless de-compression method.

10. The method of claim 9, wherein the lossless de-compression method comprises Huffman de-compression.

11. The method of claim 7, further comprising:
    splitting the broadcast signal according to the number of downstream nodes targeted by the broadcast signal.

12. An apparatus comprising:
    one or more interfaces configured to be used to receive an analog broadcast signal and one or more analog narrowcast signals;
    a converting module configured to:
    convert the analog broadcast signal into a digital broadcast signal; and
    convert the one or more analog narrowcast signals into digital narrowcast signals;
    a combining module configured to combine the digital broadcast signal and the one or more digital narrowcast signals, thus generating a single output signal, wherein combining the digital broadcast signal and the one or more digital narrowcast signals comprises associating each respective one of the one or more digital narrowcast signals with one or more sub-bands by performing a frequency analysis on the respective one digital narrowcast signal; and
    an optical interface configured to be used to output the single output signal to a downstream network component.

13. The apparatus of claim 12, wherein the single output signal is output at a single wavelength.

14. The apparatus of claim 12, wherein the digital broadcast and the one or more digital narrowcast signals are combined through dense wavelength division multiplexing.

15. The apparatus of claim 12, wherein the single output signal is compressed using a lossless compression technique.

16. The apparatus of claim 15, wherein the lossless compression technique comprises Huffman coding.

17. One or more non-transitory computer readable media having instructions operable to cause one or more processors to perform the operations comprising:
    receiving an analog broadcast signal;
    receiving one or more analog narrowcast signals;
    converting the analog broadcast signal into a digital broadcast signal;
    converting the one or more analog narrowcast signals into digital narrowcast signals;
    combining the digital broadcast signal and the one or more digital narrowcast signals, thus generating a single output signal, wherein combining the digital broadcast signal and the one or more digital narrowcast signals comprises associating each respective one of the one or more digital narrowcast signals with one or more sub-bands by performing a frequency analysis on the respective one digital narrowcast signal; and outputting the single output signal to a downstream network component.

18. The one or more non-transitory computer-readable media of claim 17, wherein the single output signal is output on an optical fiber at a single wavelength.

19. The one or more non-transitory computer-readable media of claim 17, wherein the digital broadcast and the one or more digital narrowcast signals are combined through dense wavelength division multiplexing.

20. The one or more non-transitory computer-readable media of claim 17, wherein the single output signal is compressed using a lossless compression technique.

* * * * *